Oct. 14, 1958 T. W. STONE 2,856,242
BEARING STRUCTURE
Filed March 23, 1956 2 Sheets-Sheet 1
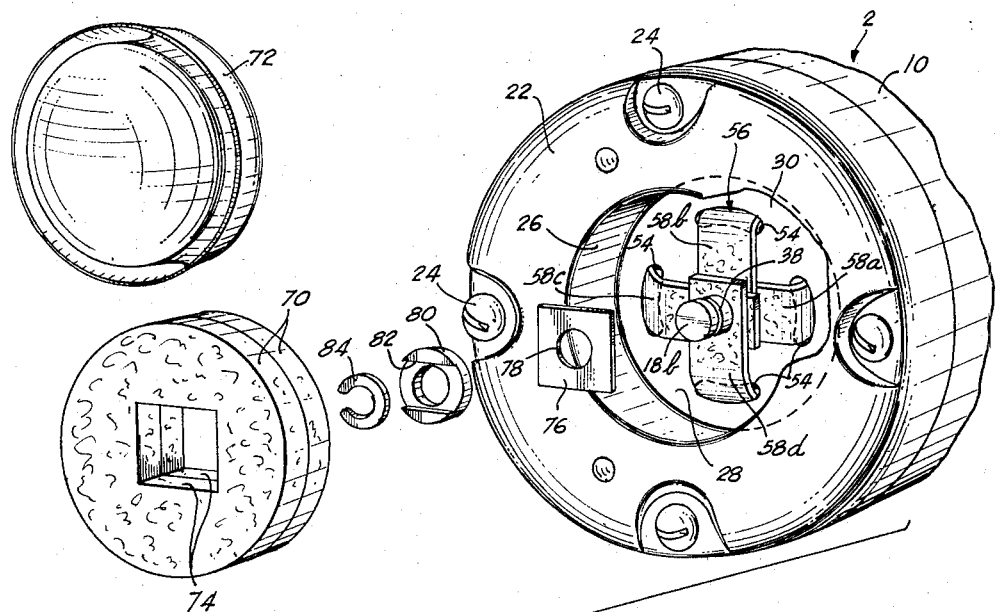
Fig. 1
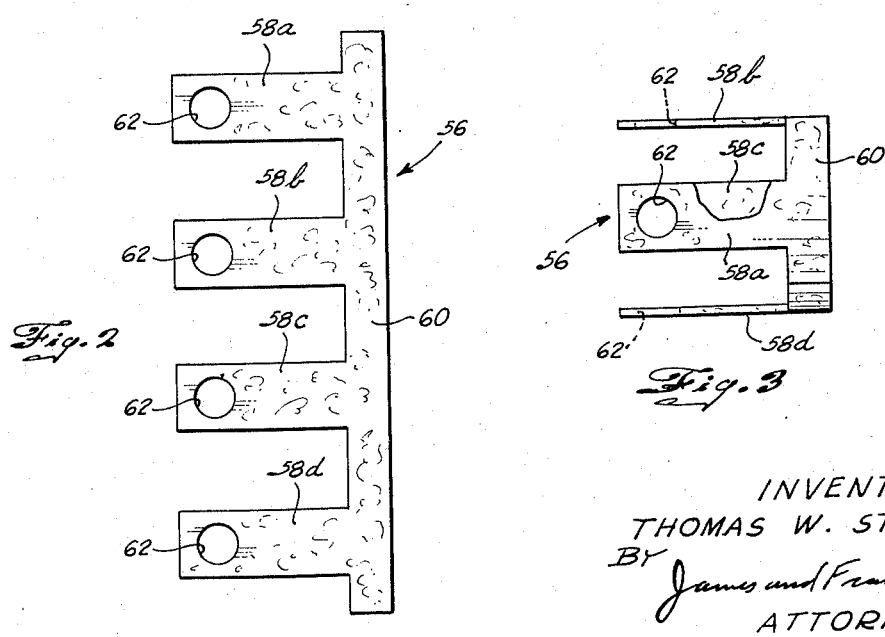
Fig. 2
Fig. 3
INVENTOR.
THOMAS W. STONE
BY James and Franklin
ATTORNEYS.

Oct. 14, 1958  T. W. STONE  2,856,242
BEARING STRUCTURE
Filed March 23, 1956  2 Sheets-Sheet 2

INVENTOR.
THOMAS W. STONE
BY
James and Franklin
ATTORNEYS.

United States Patent Office 2,856,242
Patented Oct. 14, 1958

2,856,242

BEARING STRUCTURE

Thomas W. Stone, Owosso, Mich., assignor, by mesne assignments, to Controls Company of America, Schiller Park, Ill., a corporation of Delaware Application March 23, 1956, Serial No. 573,530

20 Claims. (Cl. 308—132)

The present invention relates to a bearing structure particularly adapted for use in small electric motors of the fractional horsepower type, but is not limited thereto in its applicability.

In such motors, and many other types of rotating equipment, it is desirable that the rotating shaft be mounted so as to have as little frictional force exerted thereon as possible, and so that there is no appreciable side thrust thereon. This is particularly important when the starting characteristics of the device are critical, as is the case in many types of small motors where the starting torque, as distinguished from the running torque, is minimal.

A second major problem involved in the support of a rotating shaft is the lubrication thereof. It is common in many instances to lubricate the bearing within which the shaft rotates by feeding lubricant to an end of the shaft and providing means on the shaft or the bearing for causing that lubricant to pass axially through the bearing while the shaft is rotated. This scheme is essentially satisfactory, but supplying the lubricant to the shaft end presents certain serious problems. One way in which such lubricant has been applied involves the use of an absorbent washer having an aperture of closely the same size as the shaft end through which the shaft end fits, lubricant being supplied to the washer in any appropriate fashion. In this type of construction the size of the aperture in the washer is quite critical. If lubricant is to be supplied to the shaft the washer must engage the shaft, and for best results that engagement should be substantially uniform around the entire shaft periphery. Therefore the aperture cannot be larger than the shaft to any appreciable degree. On the other hand, if the aperture is too small the frictional force between the shaft and washer will be excessive. Even if the aperture is initially of the right size, continued rotation of the shaft will inevitably have the effect of enlarging the aperture in the washer, perhaps unevenly if the shaft is not properly balanced. When the aperture in the washer becomes greater than the size of the shaft contact between the washer and the shaft may be completely lost, or such contact may occur only over a small arcuate area of the washer, thus either cutting off or greatly minimizing the transfer of lubricant to the shaft. Moreover, when engagement between the shaft and the washer does not occur substantially uniformly around the shaft, side thrust is produced, with consequent deterioration of starting characteristics.

Another way in which the prior art has taught the feeding of lubricant to the shaft is to provide the bearing with a radial aperture within which absorbent material is positioned, that material engaging the shaft as it rotates in the bearing. Here side thrust on the shaft is always present. In addition, unless special means are provided to continue to urge the absorbent material into engagement with the shaft, continued rotation of the shaft may well wear away that absorbent material until contact with the shaft is minimized or destroyed.

To provide a rotary bearing for a shaft is usually not enough. Some means must be provided for taking up the end thrust of the shaft, and the thrust bearings provided for that purpose must be lubricated. Usually, in order to provide for disassembly of the overall unit, at least one of these thrust bearings must be readily manually disassemblable. Because it is disassemblable it often has a tendency to come apart during operation of the machine.

The construction of the present invention provides for the substantial avoidance of all of the above disadvantages. Means are provided which engage the shaft and supply lubricant thereto, that means being so constructed and arranged that it will exert but a minimal amount of friction on the shaft. In addition, not only will side thrust be eliminated, but the lubricating means will itself contribute to the "floating" of the shaft within its bearing. When the machine is operated and wear between the shaft and the lubricating means occurs, as is inevitable, that wear will not effect the functioning of the device. In addition, the particular lubricating means employed can be made to cooperate with a thrust bearing arrangement of novel design so as not only to provide lubrication therefor but also positively to prevent accidental disassembly thereof, without in any way impeding manual and purposeful disassembly.

According to my invention a plurality of apertured fingers formed of absorbent material are mounted on the frame of the machine in any appropriate manner and extend radially toward the shaft from different directions, the apertures of the fingers registering and a portion of the shaft extending therethrough. It is not at all essential that the apertures in the fingers be of closely the same size as the shaft; indeed the apertures may well be slightly larger than the shaft. Means are provided for supplying lubricant to these fingers, which in turn, through their contact with the shaft, transfer the lubricant to the shaft. The fingers are urged generally radially toward or away from the shaft in different directions respectively, and preferably in directions equally angularly spaced around the shaft axis. Hence there is little or no resultant radial force exerted on the shaft. Consequently side thrust is eliminated. If wear occurs between the shaft and any one of the fingers, the generally radially directed force active on that finger will cause it to move to compensate for that wear, so that the initial balanced condition of the shaft is maintained, and without any loss of contact between the fingers and the shaft. The forces involved are quite small, and may be derived, as here specifically disclosed, merely from the minimal degree of resiliency inherent in the material of which the fingers are formed. Hence the frictional forces exerted by the fingers on the shaft will be extremely small, but the fingers collectively will at all times engage the shaft essentially completely around its periphery, thus producing an exceptionally efficient transfer of lubricant.

The thrust bearing structure here disclosed is adapted to abut against the fingers of absorbent material, and comprises a first and non-rotatable bearing member through which the shaft freely passes and a second bearing member rotatable with the shaft and engageable with and rotatable over the first bearing member. When the second bearing member is secured to the shaft the first bearing member is pressed axially by it against the fingers, resiliently compressing the latter. The second bearing member comprises a bearing element mounted on the shaft and retained in place by a snap ring or other retaining element received within a recess in the shaft and extending out radially therefrom. The axially outer surface of the bearing element is recessed so as, when said bearing element is in its normal axially outer position, to snugly receive therewithin the radially outwardly projecting portion of the snap ring or other retaining element. The resiliency of the oil-absorbent fingers in an axial direction tends to urge the bearing element to its normal axially outer position, thus positively preventing escape of the retaining element from the shaft. However, when manual disassembly of the device is desired, it is an easy matter to push the bearing element axially inwardly, further compressing the fingers, thus permitting the retaining element to escape from the recess in the bearing element and enabling it to be removed from the shaft in conventional fashion, after which the other parts of the thrust bearing may also be removed. The resiliency of the fingers active upon the thrust bearing to keep its various parts in operative engagement also permits a certain variation in the end play of the shaft upon the application of comparatively large axial forces thereon.

The structure of the present invention is especially well adapted for use in a motor or other device having a single elongated bearing for the shaft, and may readily constitute a part of a closed and substantially lossless lubricant circulation path. The invention is here specifically disclosed as thus embodied, but it will be understood that it has much broader applicability.

To the accomplishment of the above, and to such other objects as may hereinafter appear, the present invention relates to a bearing structure as defined in the appended claims and as described in this specification, taken together with the accompanying drawings, in which:

Fig. 1 is an exploded three-quarter perspective view of one end of a fractional horsepower electric motor embodying the present invention;

Fig. 2 is a top plan view of the blank from which a portion of the lubricant feeding means is produced;

Fig. 3 is a side elevational view of the blank of Fig. 2 in an intermediate form which it assumes.

Figure 4:
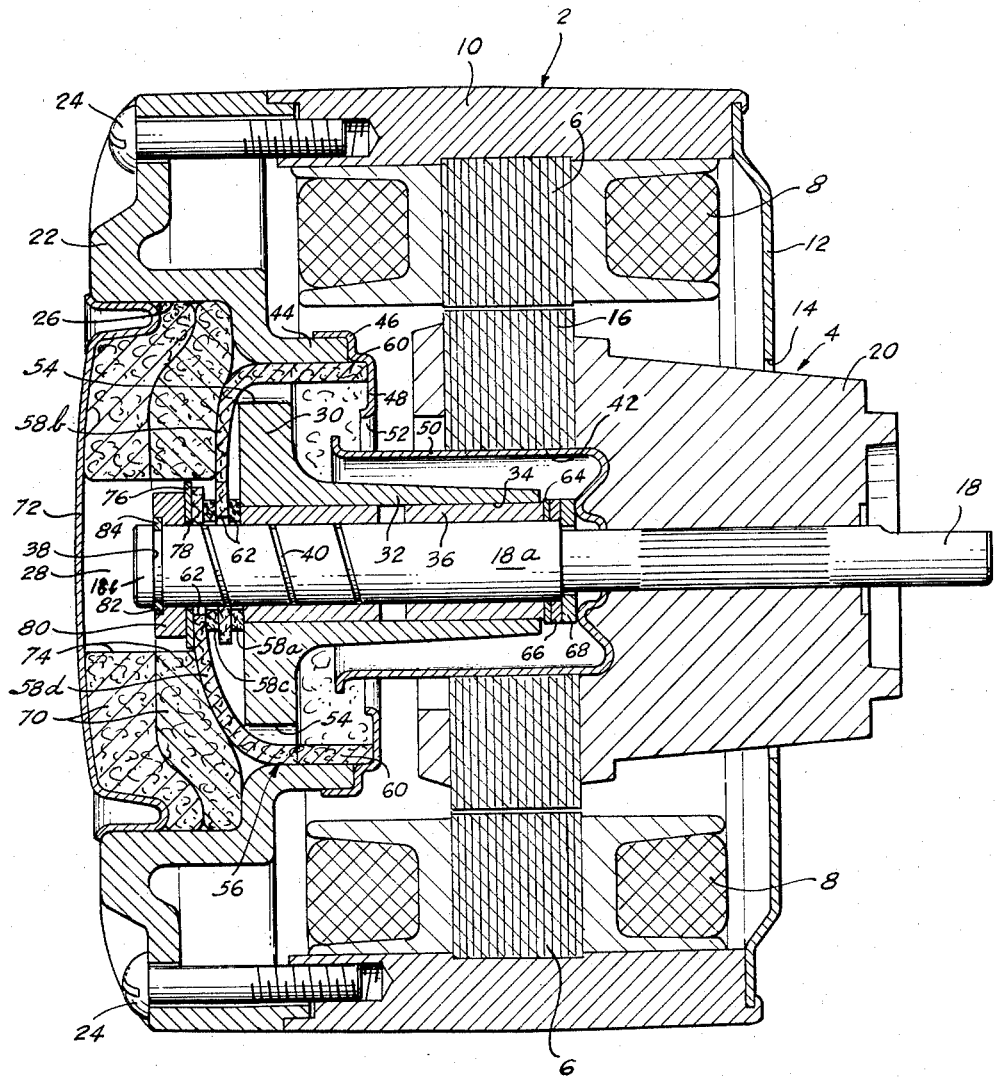
Fig. 4 is a cross sectional view of the assembled motor of Fig. 1, showing the parts in their operative positions.

The present invention is here specifically disclosed as embodied in a fractional horsepower electric motor of the single bearing type comprising a stator generally designated 2 within which a rotor generally designated 4 is adapted to rotate. The stator, as is conventional, comprises laminated pole pieces 6 on which energizing coils 8 are wound, the laminations 6 being supported in a mounting ring 10. The rotor 4 comprises a plurality of laminations 16 rotatable within and in registration with the pole pieces 6 and secured to a rotor shaft 18 by means of the massive mounting structure 20 a portion of which, along with the driving end of the shaft 18, projects out through the aperture 14 in a cover 12 which closes one end of the stator 2.

The other end of the stator 2 is closed by an end bell 22 secured to the stator ring 10 by means of mounting bolts 24. This end bell 22, at its central portion, is recessed axially inwardly at 26 to produce a lubrication cavity 28 having an inner wall 30. This inner wall has a central axially inwardly projecting portion 32 with an aperture 34 in which a bearing bushing 36 of appropriate material such as porous bronze is fixedly mounted, the portion 18a of the rotor shaft 18 being rotatable within the bearing bushing 36. The end 18b of the rotor shaft 18 extends out beyond the bushing 36 into the lubrication cavity 28 and is provided with a circumferential recess 38 adjacent its tip. A helical groove 40 is provided in the shaft portion 18 which extends from the shaft portion 18b exposed within the lubrication cavity 28 to the shaft portion 18a inside the bearing bushing 36. The rotor 4 is recessed, at 42, and the bushing 36 and shaft portion 18a extend into that recess.

The inner wall 30 of the lubrication recess 28 is provided with an axially inwardly extending flange 44 on which a metal cap 46 is mounted, that cap having a rim 48 which extends radially inwardly therefrom to define an aperture 52 coaxial with the shaft 8. Secured to the rotor 4 within the recess 42 is an oil slinger 50 which extends axially outwardly from the rotor 4 through the aperture 52.

The inner wall 40 of the lubrication cavity 28 is provided with a plurality of apertures 54, here shown as four in number, all adjacent the radially inner surface of the flange 44 and equally angularly spaced about the axis of the shaft 18.

A lubricant feeding member generally designated 56 is formed from some suitable oil absorbent material such as felt. It comprises a plurality of fingers 58a, 58b, 58c and 58d extending from an elongated body portion 60. The lubricant feeding member 56, shown in Fig. 2 in its initial form, first has its body portion 60 rolled into a circle, as shown in Fig. 3. The fingers 58a–d are then passed through the apertures 54 from right to left as viewed in Fig. 4, the circular body portion 60 fitting against the radially inner surface of the flange 44 and being held in place by the cap 46. Each of the fingers 58a–d is provided with an aperture 62 of approximately the same size as the diameter of the shaft portion 18a. The size of the apertures 62 is not particularly critical, and they may be, and often preferably are, somewhat larger than the shaft portion 18b. The fingers 58a–d, after they enter the lubrication cavity 28, are bent so that their tips overlap and their apertures 62 are in registration, and the shaft portion 18b is passed those apertures 62.

Mounted at the right hand end of the shaft portion 18a, which extends a short distance beyond the bushing 36, is a thrust bearing assembly comprising a metal washer 64 and a combination cork and neoprene washer 66. Mounted on the shaft portion 18 proper, which may be of smaller diameter than the shaft portion 18a, is a metal washer 68.

The bulk of the lubrication cavity 28 is filled by one or more masses 70 of oil absorbent material such as felt, held in place by a cover 72 firmly frictionally received on the end bell 22. These masses 70 have central openings 74 which are preferably non-circular in configuration. Received within an opening 74, and preferably having an external configuration of substantially the same size and shape, is a steel washer 76 having an aperture 78 through which the shaft portion 18b freely passes. The washer 78 defines a first and non-rotatable thrust bearing member. Mounted on the shaft portion 18b axially outwardly from the washer 76, and rotatable with the shaft 18, is a washer 80, which may be formed of any suitable bearing material such as sintered iron and lead. Its axially inner surface engages and rotates over the axially outer surface of the washer 76. The washer 80 constitutes a bearing element forming a part of a second and rotatable thrust bearing member cooperable with the first and non-rotatable thrust bearing member 76. The remainder of the second thrust bearing member is defined by a retaining element 84, here shown in the form of a snap ring, which is received within the circumferential recess 38 near the tip of the shaft portion 18b and extends radially out therefrom. The outwardly radially extending portion of the retaining element 84 snugly fits within recess 82 in the bearing element 80, so that when the parts are in their position shown in Fig. 4, the retaining element 84 is positively prevented from expanding and hence cannot escape from the circumferential shaft recess 38.

In use the absorbent masses 70 will be substantially saturated with lubricant, the cover 72 will be placed in position, and the motor will then be in condition to operate for an exceedingly long time without any need to replenish the lubricant supply. Insofar as the rotary bearing is concerned, a closed lubricant path is defined as follows: Oil taken up by the fingers 58a–d will be conveyed and transferred to the shaft portion 18b, and as the shaft rotates the helical groove 40 will carry that lubricant into the bearing bushing 36. Lubricant will thus be forced axially through the bushing 36 from left to right as viewed in Fig. 4, lubricating the entire rotary bearing surface. The lubricant will escape from the bushing 36 at its right hand end, will lubricate the thrust bearing surfaces at that end, and then will be centrifugally urged onto the oil slinger 50, which will forcibly convey it to the space inside the cap 46 and will throw it radially outwardly onto the body portion 60 of the lubrication member 56. The fingers 58a–d integral therewith will function as wicks and will carry the lubricant back to the shaft end 18b.

Because the fingers 58a–d will normally tend to assume their straight position shown in Fig. 3, they will each exert a small radial force on the shaft end 18b. However, since the fingers 58a–d are so positioned as to be substantially equally angularly displaced around the axis of the shaft 58, the resultant of these radial forces will be zero or substantially so, and hence there will be no appreciable side thrust. Indeed, the fingers 58a–d will affirmatively tend to cause the shaft 18 to "float" within the bearing bushing 36. Because of the radial pull of each of the fingers 58a–d on the shaft end 18b, the fact that the apertures 62 may be slightly larger than the diameter of the shaft portion 18b is immaterial. As may be seen in Fig. 4, the finger 58d engages the shaft portion 18b substantially only at the top thereof, whereas the finger 58b engages the shaft portion 18b substantially only at the bottom thereof. The fingers 58a and 58c engage the shaft portion 18b substantially only at the left and right sides thereof respectively. Thus, although each of the apertures 62 may, as shown, be somewhat larger than the shaft portion 18b, the overall contact area between the shaft and the fingers extends substantially completely around the periphery of the shaft. Thus effective and uniform transfer of lubricant results. The frictional force exerted by each of the fingers 58a–d on the shaft portion 18b is quite small, and as a result the overall frictional force is considerably less than would be exerted by a single washer of the prior art type having a thickness comparable to the combined thicknesses of the fingers 58a–d. Moreover, if wear occurs between the shaft portion 18a and the inner surfaces of the apertures 62 of any one of the fingers 58a–d, the fingers will shift their position because of the tendency of the fingers to assume the position shown in Fig. 3, thus compensating for that wear and ensuring that continued contact between the shaft portion 18b and all of the fingers 58a–d substantially completely around the shaft and with but minimal frictional force exerted on the shaft will continue to exist.

When the thrust bearing at the left hand end of the shaft 18 is assembled the washer 76 will tend to compress the tips of the fingers 58a–d between itself and the inner wall 30 of lubrication cavity 28. The fingers 58a–d will supply lubricant to the thrust bearing in question. In addition, the axial resiliency of the finger tips will retain the thrust bearing parts in their position shown in Fig. 4, thus positively preventing escape of the retaining element 84 from the circumferential shaft recess 38. However, when disassembly of the thrust bearing is desired, the bearing element 80 may be manually pushed axially inwardly, further compressing the tips of the fingers 58a–d, until its recessed outer surface is positioned axially inwardly of the retaining element 84. That element 84 may then be removed from the shaft portion 18b in conventional manner, after which both the bearing element 80 and the washer 76 may be slid over the shaft end 18b.

It will further be noted that the fingers 58a–d will also serve to resiliently restrict end play of the shaft 18 and the rotor 4, but will permit axial motion thereof when large forces are applied thereto, thereafter resiliently restoring the parts to their proper axial position.

From the above it will be seen that the structure of the present invention, although exceptionally simple and easily constructed and assembled, provides manifold advantages over the prior art structures insofar as dependability, effectiveness of lubrication, positive retention of the thrust bearing on the shaft, resilient control of end play, and minimization of friction and side thrust are concerned.

While but a single embodiment of the present invention has been here disclosed, it will be apparent that many changes may be made therein, all within the spirit of the invention as defined in the following claims.

I claim:

1. A lubrication arrangement comprising a support, a shaft articulately mounted therein, and a plurality of absorbent elements each having an aperture through which said shaft passes, means for urging each of said elements in a different direction substantially at right angles to the axis of said shaft, and means for supplying lubricant to said elements.

2. The lubrication arrangement of claim 1, in which the apertures in said elements are sufficiently larger than the diameter of said shaft so as to produce a clearance between said shafts and said elements around a substantial portion of the periphery of said shaft.

3. A lubrication arrangement comprising a support, a shaft articulately mounted therein, a plurality of elongated elements of absorbent material mounted on said support so as to extend toward said shaft from points remote from said shaft and spaced circumferentially therearound, said elements overlapping one another in line with said shaft and having registering apertures at their overlapping portions through which said shaft passes, and means for supplying a lubricant to said fingers.

4. The lubrication arrangement of claim 3, in which the apertures in said elements are sufficiently larger than the diameter of said shaft so as to produce a clearance between said shafts and said elements around a substantial portion of the periphery of said shaft.

5. A lubrication arrangement comprising a support, a shaft articulately mounted therein, a plurality of elongated elements of absorbent material mounted on said support so as to extend toward said shaft from points remote from said shaft and spaced circumferentially therearound, said elements overlapping one another in line with said shaft and having registering apertures at their overlapping portions through which said shaft passes, means for urging said fingers in different directions substantially at right angles to the axis of said shaft, and means for supplying lubricant to said fingers.

6. The lubrication arrangement of claim 5, in which the apertures in said elements are sufficiently larger than the diameter of such shaft so as to produce a clearance between said shafts and said elements around a substantial portion of the periphery of said shaft.

7. An electric motor comprising a stator including a bearing, a rotor rotatable with respect to said stator and operatively connected to a shaft, said shaft being rotatable in said bearing and having an end extending out beyond the corresponding end of said bearing, said stator comprising a part at least partially surrounding said bearing and having a plurality of apertures radially and circumferentially spaced relative to said bearing, a plurality of elongated elements of absorbent material passing through said apertures from one side of said stator part to the other, said elements having apertures through which said shaft end extends, and means for supplying lubricant to said elements.

8. The lubrication arrangement of claim 7, in which the apertures in said elements are sufficiently larger than the diameter of such shaft so as to produce a clearance between said shafts and said elements around a substantial portion of the periphery of said shaft.

9. An electric motor comprising a stator including a bearing and having a lubrication cavity adjacent one end of said bearing, a rotor rotatable with respect to said stator and operatively connected to a shaft, said shaft being rotatable in said bearing and having an end extending out beyond said bearing with said lubrication cavity, said stator comprising a part at least partially surrounding said bearing and having a plurality of apertures radially and circumferentially spaced relative to said bearing, a plurality of elongated elements of absorbent material passing through said apertures from one side of said stator part to the other, one end of each of said elements projecting into said lubrication cavity and extending substantially at right angles to the axis of said shaft, said element ends overlapping and having apertures through which said shaft end extends, and means for supplying lubricant to said elements.

10. The lubrication arrangement of claim 9, in which the apertures in said elements are sufficiently larger than the diameter of such shaft so as to produce a clearance between said shafts and said elements around a substantial portion of the periphery of said shaft.

11. The electric motor of claim 9, in which said lubrication cavity has an oil-absorbent stuffing therein, said ends of said elements engaging said stuffing, said stuffing having an aperture through which said shaft end extends.

12. The electric motor of claim 11, said stuffing aperture being non-circular, a first bearing member in said stuffing aperture, non-rotatable relative thereto, and operatively engaging said elongated elements so as to be resiliently urged axially outwardly thereby, said shaft end passing through and being rotatable relative to said first bearing member, and a second bearing member on said shaft end, rotatable within said stuffing aperture, and operatively engaging said first bearing member on the side thereof axially opposite said elongated elements.

13. The electric motor of claim 11, said stuffing aperture being non-circular, a first bearing member in said stuffing aperture, non-rotatable relative thereto, and operatively engaging said elongated elements so as to be resiliently urged axially outwardly thereby, said shaft end passing through and being rotatable relative to said first bearing member, and a second bearing member on said shaft end, rotatable within said stuffing aperture, and operatively engaging said first bearing member on the side thereof axially opposite said elongated elements, said second bearing member comprising a bearing element receivable on said shaft end and having a recess in its axially outer face, the axially inner face thereof operatively engaging said first bearing member, said shaft end having a circumferential recess axially outwardly beyond said bearing element, a retaining element received in said circumferential recess and projecting radially therefrom, thus preventing escape of said bearing element from said shaft end, the radially projecting portion of said retaining element being received within said recess in said bearing element outer face when said bearing element is resiliently urged axially outwardly by said elongated elements acting via said first bearing member, thus preventing escape of said retaining element from said shaft.

14. A thrust bearing arrangement comprising a support, a shaft rotatable therein and having an end extending therefrom, a first metallic bearing element through which said shaft end rotatably passes, resilient means operatively connected to said first bearing element so as to urge said element axially outwardly, a second metallic one-piece bearing element receivable on and rotatable with said shaft axially outwardly beyond said first bearing element, said second bearing element having a recess in its axially outer face, the axially inner face thereof operatively engaging said first bearing element, said shaft end having a circumferential recess axially outwardly beyond said second bearing element, a retaining element received in said circumferential recess and projecting radially therefrom, thus preventing escape of said second bearing element from said shaft end, the radially projecting portion of said retaining element being received within said recess in said second bearing element outer face when said second bearing element is resiliently urged axially outwardly via said first bearing element, thus preventing escape of said retaining element from said shaft.

15. A thrust bearing arrangement comprising a support, a shaft rotatable therein and having an end extending therefrom, a first metallic bearing element through which said shaft end rotatably passes, resilient means operatively connected between said first bearing element and said support so as to urge said first bearing element axially outwardly, a second metallic one-piece bearing element receivable on and rotatable with said shaft axially outwardly beyond said first bearing element, said second bearing element having a recess in its axially outer face, the axially inner face thereof operatively engaging said first bearing element, said shaft end having a circumferential recess axially outwardly beyond said second bearing element, a retaining element received in said circumferential recess and projecting radially therefrom, thus preventing escape of said second bearing element from said shaft end, the radially projecting portion of said retaining element being received within said recess in said second bearing element outer face when said second bearing element is resiliently urged axially outwardly via said first bearing element, thus preventing escape of said retaining element from said shaft.

16. A thrust bearing arrangement comprising a support, a shaft rotatable therein and having an end extending therefrom, a first metallic bearing element through which said shaft end rotatably passes, said first bearing element being non-rotatably mounted relative to said support, resilient means operatively connected to said first bearing element so as to urge said first bearing element axially outwardly, a second metallic one-piece bearing element receivable on and rotatable with said shaft axially outwardly beyond said first bearing element, said second bearing element having a recess in its axially outer face, the axially inner face thereof operatively engaging said first bearing element, said shaft end having a circumferential recess axially outwardly beyond said second bearing element, a retaining element received in said circumferential recess and projecting radially therefrom, thus preventing escape of said second bearing element from said shaft end, the radially projecting portion of said retaining element being received within said recess in said second bearing element outer face when said second bearing element is resiliently urged axially outwardly via said first bearing element, thus preventing escape of said retaining element from said shaft.

17. A thrust bearing arrangement comprising a support, a shaft rotatable therein and having an end extending therefrom, a first metallic bearing element through which said shaft end rotatably passes, said first bearing element being non-rotatably mounted relative to said support, resilient means operatively connected between said first bearing element and said support so as to urge said first bearing element axially outwardly, a second metallic one-piece bearing element receivable on and rotatable with said shaft and axially outwardly beyond said first bearing element, said second bearing element having a recess in its axially outer face, the axially inner face thereof operatively engaging said first bearing element, said shaft end having a circumferential recess axially outwardly beyond said second bearing element, a retaining element received in said circumferential recess and projecting radially therefrom, thus preventing escape of said second bearing element from said shaft end, the radially projecting portion of said retaining element being received within said recess in said second bearing element outer face when said second bearing element is resiliently urged axially outwardly via said first bearing element, thus preventing escape of said retaining element from said shaft.

18. The thrust bearing arrangement of claim 14, in which said resilient means comprises an oil absorbent element having an aperture through which said shaft end passes, and means for supplying lubricant to said absorbent element.

19. In the thrust bearing arrangement of claim 14, oil absorbent material surrounding said shaft end and having an aperture through which said shaft end, second bearing element and retaining element rotatably extend and within which said first bearing element is non-rotatably received.

20. The thrust bearing arrangement of claim 14, in which said resilient means comprises an oil-absorbent element having an aperture through which said shaft end passes, and means for supplying lubricant to said absorbent element, and oil absorbent material surrounding said shaft end and having an aperture through which said shaft end, second bearing element and retaining element rotatably extend and within which said first bearing element is non-rotatably received.

References Cited in the file of this patent

UNITED STATES PATENTS

| | | |
|---|---|---|
| 1,328,064 | Vasselli | Jan. 13, 1920 |
| 1,687,668 | Himes | Oct. 16, 1928 |
| 2,633,393 | Bradley | Mar. 31, 1953 |